United States Patent
Okada et al.

[11] Patent Number: 6,167,091
[45] Date of Patent: *Dec. 26, 2000

[54] IMAGE DATA ENCODING APPARATUS

[75] Inventors: Masaki Okada; Tomohiro Fukuoka, both of Kasugai, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/071,992

[22] Filed: May 5, 1998

[30] Foreign Application Priority Data

Oct. 30, 1997 [JP] Japan ................................. 9-298702

[51] Int. Cl.[7] .................................................. H04N 7/12
[52] U.S. Cl. .................... 375/240.19; 382/239; 382/232; 382/246; 386/123
[58] Field of Search ..................................... 348/404, 405, 348/406; 375/240.19; 382/232, 239, 246; 386/123

[56] References Cited

U.S. PATENT DOCUMENTS

| | | | |
|---|---|---|---|
| 5,426,463 | 6/1995 | Reininger et al. | 348/405 |
| 5,444,490 | 8/1995 | De With et al. | 348/423 |
| 5,548,336 | 8/1996 | Ueda | 348/403 |
| 5,644,306 | 7/1997 | Brent | 341/67 |
| 5,703,646 | 12/1997 | Oda | 348/401 |
| 5,754,227 | 5/1998 | Fukuoka | 348/232 |
| 5,767,910 | 6/1998 | Iizuka | 348/403 |
| 5,798,796 | 8/1998 | Sugiyama | 348/405 |
| 5,801,779 | 9/1998 | Uz et al. | 348/420 |
| 5,801,841 | 9/1998 | Suzuki | 358/433 |
| 5,874,999 | 2/1999 | Suzuki et al. | 348/556 |
| 5,911,010 | 6/1999 | Nakajima | 382/239 |

*Primary Examiner*—Chris S. Kelley
*Assistant Examiner*—Shawn S. An
*Attorney, Agent, or Firm*—Staas & Halsey LLP

[57] ABSTRACT

An image data encoding apparatus performs a two-step process to expand and compress digital image data. The apparatus includes a transform unit for performing orthogonal transform of the image data in a block-by-block manner and generating transform coefficient data. In the first step of the encoding step, a quantizer quantizes the transform coefficient data using a first quantization coefficient to generate first code data. A coefficient operation unit receives the first code data and computes a second quantization coefficient for determining an optimal compression rate of the image data. In the second step of the encoding process, the quantizer receives the second quantization coefficient and quantizes the transform coefficient data to generate second code data. The transform coefficient data is stored in a memory. By optimally compressing the image data, a high image data compression rate is achieved, which allows a greater number of compressed images to be stored. Also, by pipelining the encoding and decoding processes, image processing time is decreased.

2 Claims, 9 Drawing Sheets

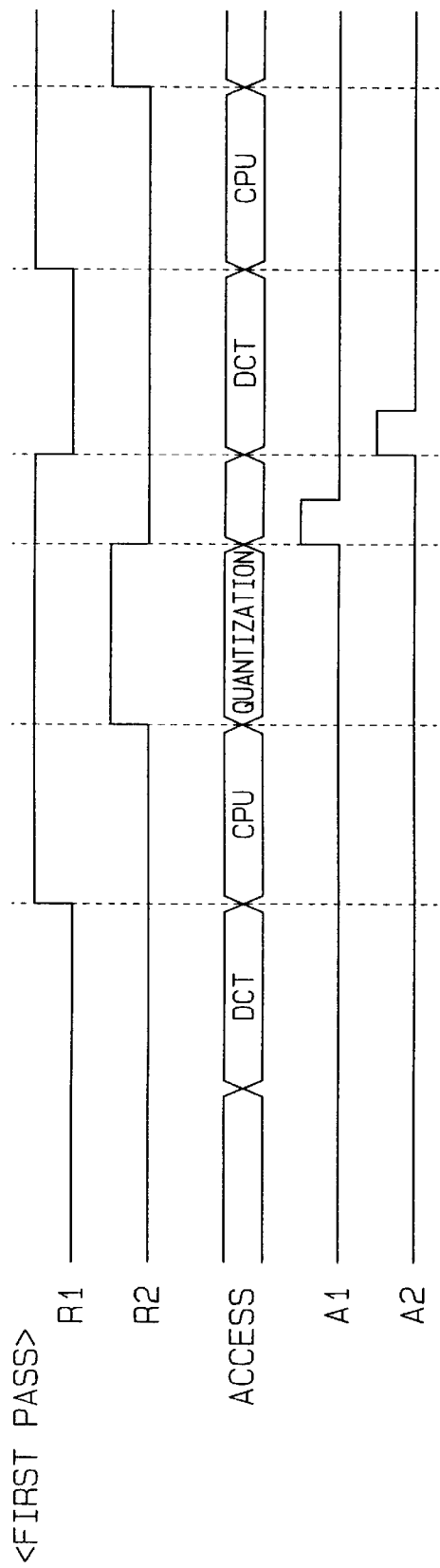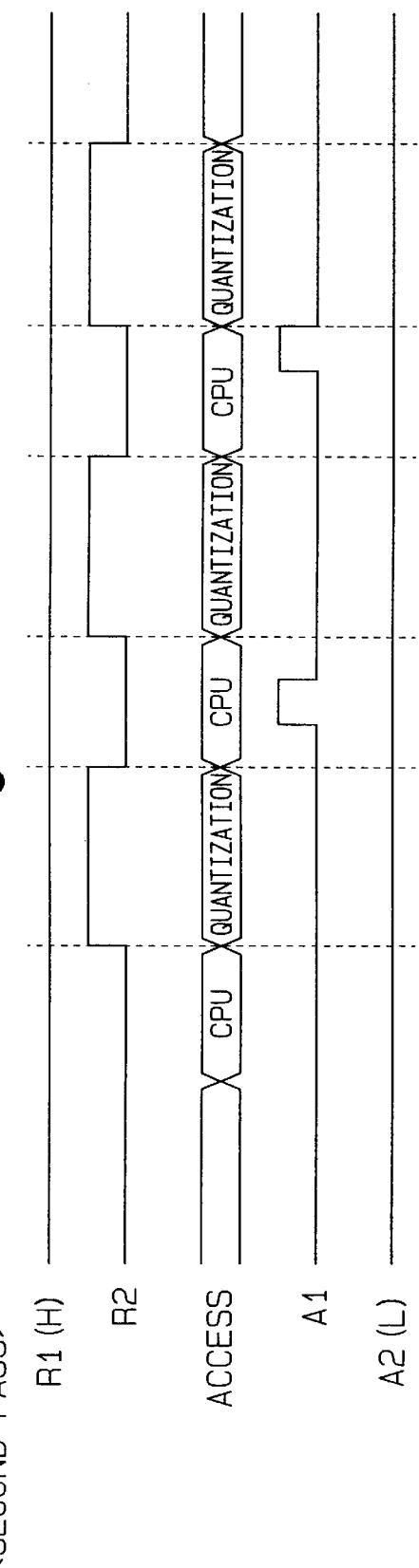

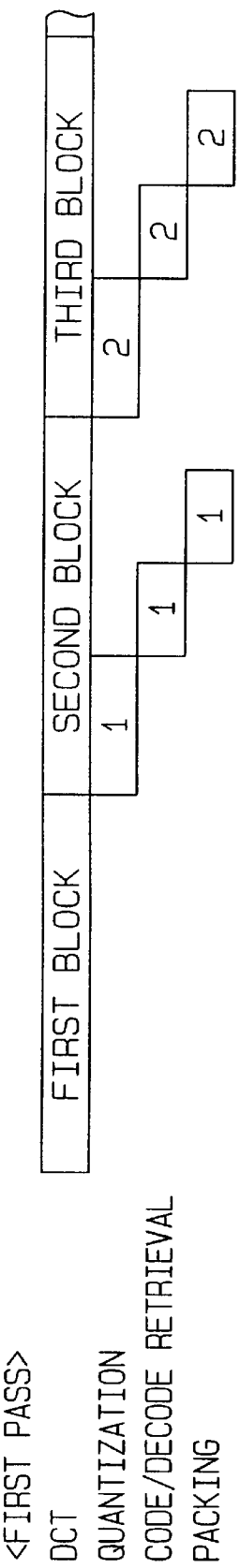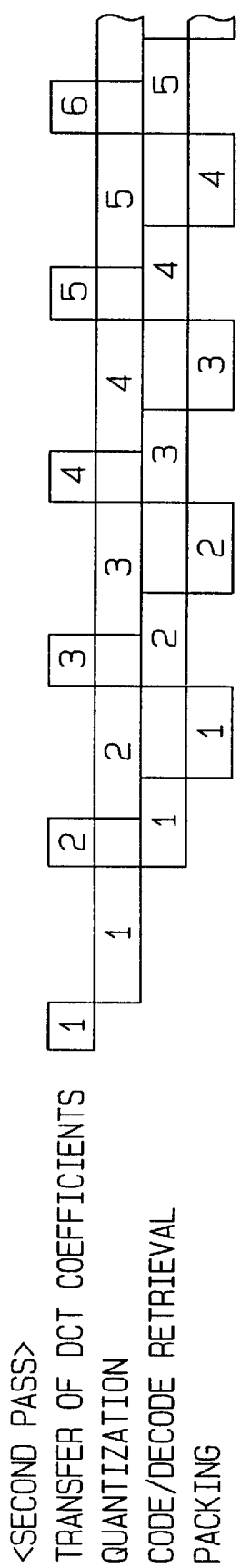

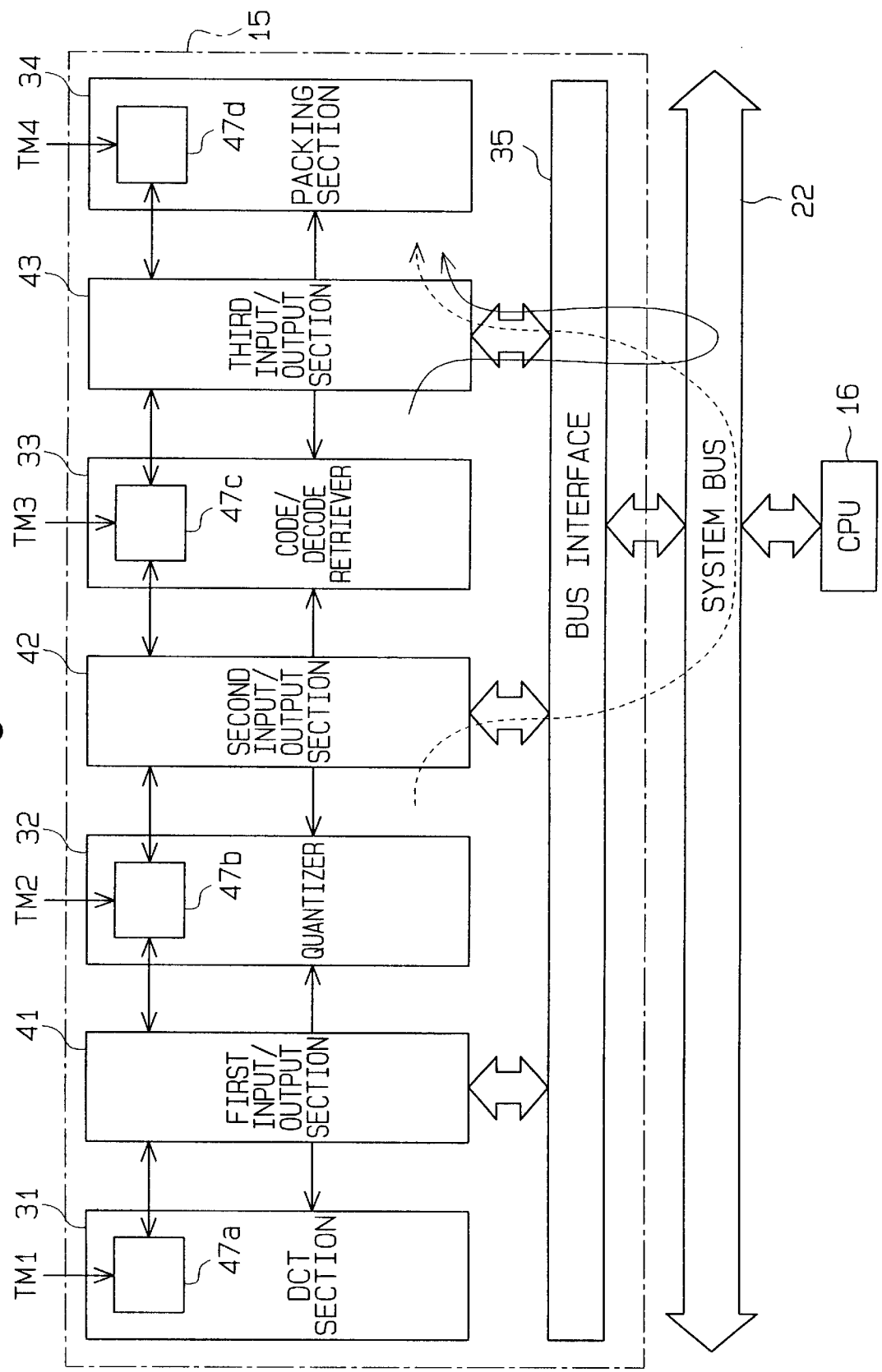

IMAGE DATA ENCODING APPARATUS

BACKGROUND OF THE INVENTION

The present invention relates generally to an image information processing and encoding apparatus which compresses and expands image data, and, more particularly, to an apparatus which provides high compression of image data and a shortening of the image processing time.

FIG. 1 is a block diagram of an encoder/decoder 91 which is used in an image processing system, such as a digital still camera. The encoder/decoder 91 receives image data output from an image pickup device (not shown) like a CCD (Charge-Coupled Device), and performs a coding and compressing process on the image data in accordance with a predetermined standard or system (e.g., the JPEG system) to generate compressed image data. At the time the compressed image data is displayed on a display unit (not shown) like an LCD, the encoder/decoder 91 performs a decoding and expanding process on the compressed image data to reproduce the image data.

The encoder/decoder 91 has a DCT (Discrete Cosine Transform) section 92, a quantizer 93, a code/decode retriever 94, a packing section 95, a DCT coefficient buffer 96 and first and second buffers 97a and 97b. The image data is segmented into a plurality of blocks each including 8×8 pixel data. The image data is input to the DCT section 92 in a block by block manner. The DCT section 92 receives one block of image data and performs an orthogonal transform, such as a two-dimensional discrete cosine transform (DCT), on the block of image data to produce DCT coefficient data. The DCT section 92 stores the generated DCT coefficient data into the DCT coefficient buffer 96, and sends the quantizer 93 a signal indicating an end of the image data transform.

In response to the end signal, the quantizer 93 receives one block of DCT coefficient data from the DCT coefficient buffer 96 and divides that block of DCT coefficient data by quantization coefficient data, stored in the first buffer 97a, to generate quantized data.

The code/decode retriever 94 has a Huffman table 98 where plural pieces of Huffman code data are stored. The code/decode retriever 94 receives quantized data from the quantizer 93 and searches the Huffman table 98 to convert the quantized data to variable-length code data.

The packing section 95 receives blocks of the variable-length code data from the code/decode retriever 94, and generates fixed-length code data of a predetermined bit length. The fixed-length code data is suitable for compressed image data to be input to, and output from, a memory in the predetermined bit length.

A controller 90, such as a CPU, controls the encoder/decoder 91 to carry out a two-pass process, which generates fixed-length code data twice for one screen of image data. Specifically, the controller 90 generates second quantization coefficient data to determine an optimal compression rate for image data based on the amount of one screen of fixed-length code data that has been produced in the first pass, and stores it in the second buffer 97b. In the second pass, the quantizer 93 receives DCT coefficient data from the DCT section 92 via the DCT coefficient buffer 96 and generates quantized data using the second quantization coefficient data.

As the image data is compressed at the optimal compression rate in the second pass, the amount of one screen of fixed-length code data generated in the second pass is smaller than that generated in the first pass. This technique ensures a greater image data compression rate, which contributes to reducing the capacity requirement of the memory that stores the compressed image data. In other words, the number of compressed images storable in the memory is increased.

The DCT section 92, the quantizer 93 and the code/decode retriever 94 execute compression processing on the image data in a block by block manner through a pipeline operation in order to shorten the speed of processing of one screen of image data. When the quantizer 93 is quantizing the first block of DCT coefficient data, for example, the DCT section 92 generates the second block of DCT coefficient data following the first block.

The time required for the second-pass process however affects the operability of, for example, a digital still camera. A digital camera is capable of executing a compression process for one screen after completing compression of the previous one screen of image data. That is, after compression is finished, the next image pickup is possible. Longer compression time results in a longer image pickup interval, which deteriorates the operability of the camera.

Accordingly, it is a primary objective of the present invention to provide an image information processing apparatus and an encoding apparatus having a decreased compression processing time while maintaining a high compression rate.

SUMMARY OF THE INVENTION

Briefly stated, the present invention provides an image information processing apparatus for compressing image data using a first encoding process and a second encoding process. The image data includes a plurality of data blocks. The apparatus includes a transform unit, a quantizer unit, a coefficient operation unit, a memory unit, an input/output unit and a controller unit. The transform unit performs orthogonal transform of the image data in a block-by-block manner and generates transform coefficient data. The quantizer unit receives, in the first encoding process, the transform coefficient data from the transform unit and quantizes the transform coefficient data using a predetermined first quantization coefficient to generate first code data. The coefficient operation unit receives the first code data and computes a second quantization coefficient for determining an optimal compression rate of the image data. The quantizer unit receives, in the second encoding process, the second quantization coefficient from the coefficient operation unit and quantizes the transform coefficient data using the second quantization coefficient to generate second code data. The memory unit stores the transform coefficient data for at least one screen of image data. The input/output unit is connected to the transform unit, the quantizer unit and the memory unit and performs an input/output operation of the transform coefficient data between the transform unit and the memory unit and between the quantizer unit and the memory unit. The controller unit is connected to the input/output unit and controls, in the first encoding process, the input/output unit to provide the transform coefficient data from the transform unit to the quantizer unit and store the transform coefficient data in the memory unit in a block-by-block manner. In the second encoding process step, the controller unit controls the input/output unit to transfer the transform coefficient data stored in the memory unit to the quantizer unit in a block-by-block manner.

The present invention provides an encoding apparatus for compressing a screen of image data using a first encoding process and a second encoding process with a memory unit. The image data includes a plurality of data blocks. The encoding apparatus includes a transform unit, a quantizer unit and an input/output unit. The transform unit for performs orthogonal transform of the image data in a block-by-block manner and generates transform coefficient data. The quantizer unit, in the first encoding process, receives the transform coefficient data from the transform unit and quantizes the transform coefficient data using a predetermined first quantization coefficient to generate first code data. In the second encoding process, the quantizer unit quantizes the transform coefficient data using a second quantization coefficient to generate second code data. The second quantization coefficient is set based on the first code data such that the second code data is generated at an optimal compression rate. The input/output unit is connected between the transform unit and the quantizer unit and transfers the transform coefficient data from the transform unit to the quantizer unit. In the first encoding process, the input/output unit provides the transform coefficient data from the transform unit to the quantizer unit and stores the transform coefficient data in the memory unit in a block-by-block manner. In the second encoding process, the input/output unit transfers the transform coefficient data stored in the memory unit to the quantizer unit.

The present invention provides a method of compressing one screen of image data using a first encoding process and a second encoding process, and generating code data. One screen of image data includes a plurality of image data blocks. The method includes the steps of: in the first encoding process, performing orthogonal transform of the image data in a block-by-block manner to generate transform coefficient data; quantizing the transform coefficient data using a predetermined first quantization coefficient to generate first code data; storing the first code data for at least one screen of image data in a memory unit in a block-by-block manner; computing a second quantization coefficient, using the first code data, for determining an optimal compression rate of the at least one screen of image data; in the second encoding process, reading the transform coefficient data stored in the memory unit in a block-by-block manner; and quantizing the transform coefficient data using the second quantization coefficient to generate second code data.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8A is a waveform chart illustrating a coding process in a first pass which is executed by the encoder/decoder of FIG. 4, and FIG. 8B is a waveform chart showing a coding process in a second pass;

FIG. 9A is a diagram showing a pipeline process in the first pass which is executed by the encoder/decoder of FIG. 4, and FIG. 9B is a diagram showing a pipeline process in the second pass;

FIG. 10 is a diagram illustrating a CPU acting for the encoder/decoder and the CPU affixing information to processed data.

DETAILED DESCRIPTION OF THE PREFERRED EMBODIMENT

Figure 1:
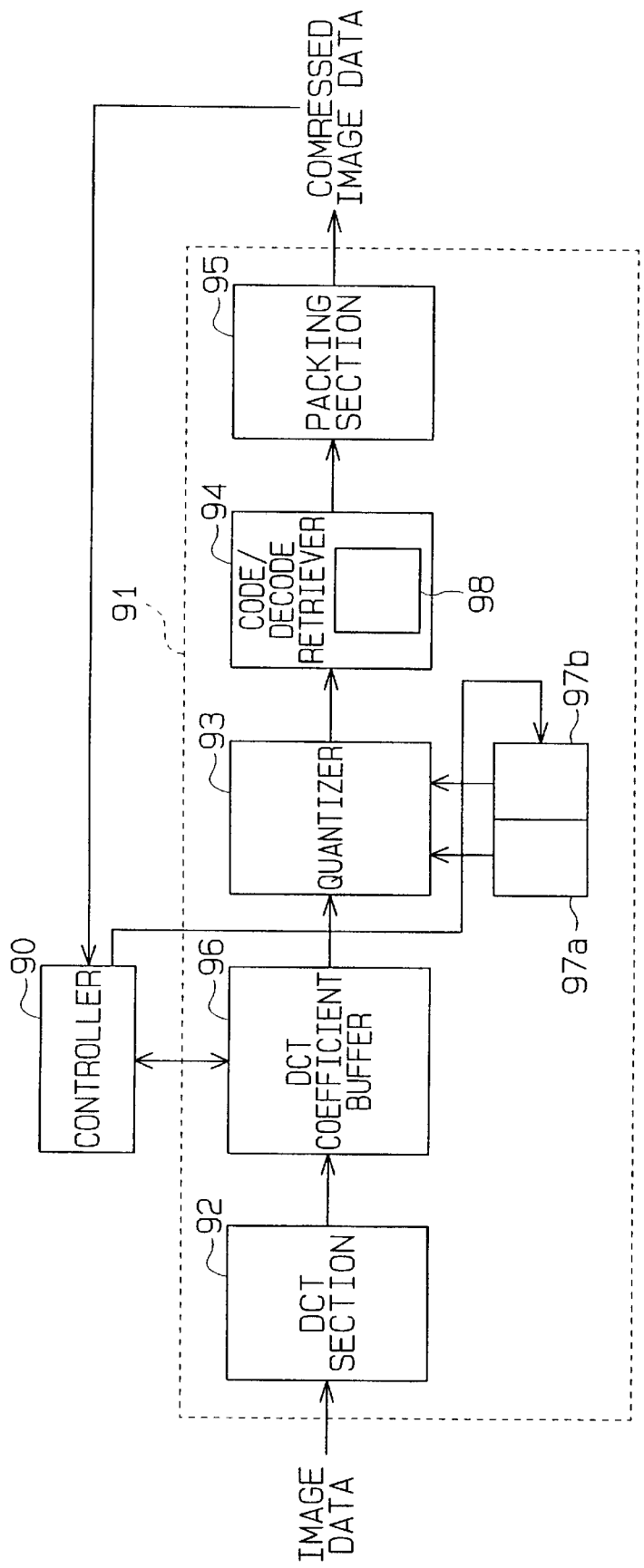
FIG. 1 is a schematic block diagram of a conventional encoder/decoder.
Figure 2:
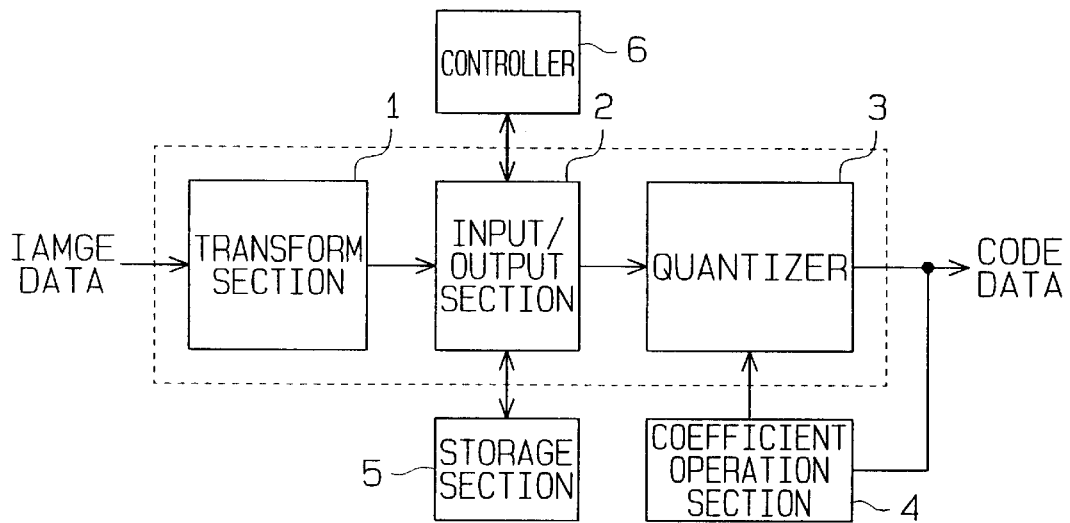
FIG. 2 is a principle block diagram of the image information processing apparatus embodying the present invention.

FIG. 2 is a schematic block diagram of an image information processing apparatus for compressing image data embodying the present invention. The image information processing apparatus comprises a transform section 1, an input/output section 2, a quantizer 3, a coefficient operation section 4, a storage section 5 and a control section 6. The transform section 1 performs an orthogonal transform of the image data in a block by block manner to generate transform coefficient data. The quantizer 3 quantizes transform coefficient data using a predetermined first quantization coefficient in a first pass to generate first code data, and quantizes the transform coefficient data using a second quantization coefficient in a second pass to generate second code data. In accordance with the amount of the first code data, the coefficient operation section 4 computes the second quantization coefficient that determines an optimal compression rate. The input/output section 2 is connected between the transform section 1 and the quantizer 3, and is further connected to the storage section 5 which stores preferably one screen of transform coefficient data. The controller 6 controls the input/output section 2 to receive transform coefficient data, in a block by block manner, from the transform section 1 and stores the transform coefficient data in the storage section 5 in the first pass. In the second pass, the controller 6 controls the input/output section 2 to send the transform coefficient data, stored in the storage section 5, in a block by block manner to the quantizer 3. Because the transform coefficient data is supplied to the quantizer 3 from the storage section 5 in the second pass without operating the transform section 1, the compression processing time is decreased.

Figure 3:
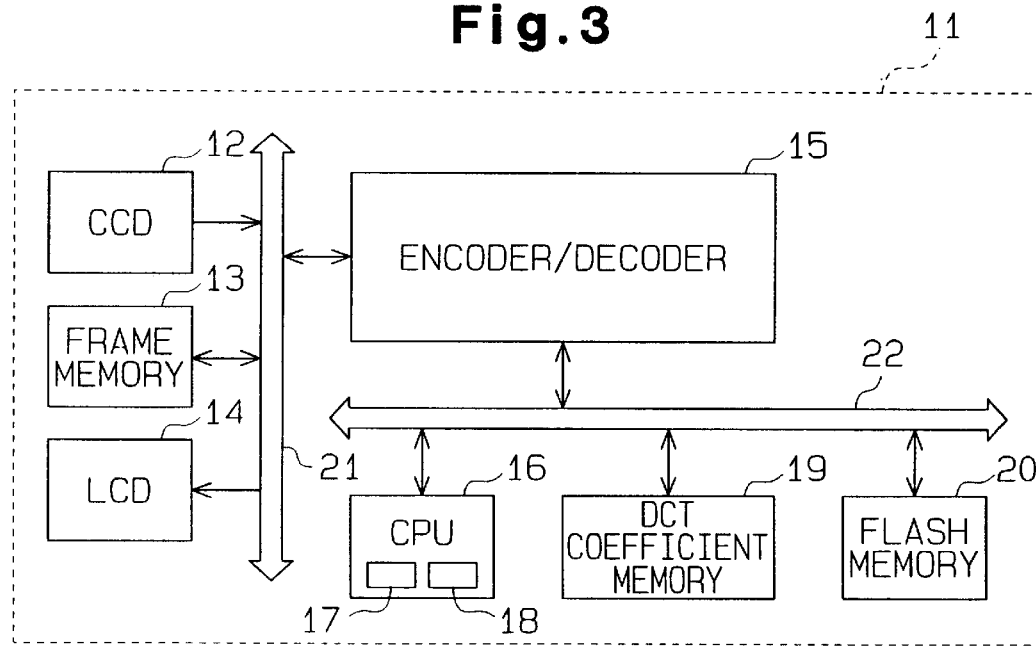
FIG. 3 is a schematic block diagram of an image information processing apparatus of FIG. 2.

One embodiment of the present invention will now be discussed with reference to FIGS. 3 through 10. FIG. 3 is a schematic block diagram of an image information processing apparatus 11 for use in a digital still camera.

The image information processing apparatus 11 comprises a CCD 12, a frame memory 13, an LCD 14, an encoder/decoder 15, a CPU 16, a DCT coefficient memory 19, a flash memory 20, an image-only bus 21 and a system bus 22. Mutually connected to the image-only bus 21 are the CCD 12, the frame memory 13, the LCD 14 and the encoder/decoder 15. The encoder/decoder 15, the CPU 16, the DCT coefficient memory 19 and the flash memory 20 are mutually connected to the system bus 22.

The CCD 12 is an image pickup device which acquires an image, and produces image data representing information of an incident image, such as the color tone and density. One screen of image data is transferred via the image-only bus 21 to the frame memory 13 from the CCD 12.

The frame memory 13 stores preferably one screen of image data supplied via the image-only bus 21 from the CCD 12 or the encoder/decoder 15. The LCD 14 receives image data, stored in the frame memory 13, via the image-only bus 21 and displays the data.

The encoder/decoder 15 performs coding and decoding process (compression and expansion) in accordance with a predetermined system (the JPEG system in this embodiment). The coding process, which compresses image data to produce compressed data, includes DCT, quantization and entropy coding. The decoding process, which decodes compressed data to produce decompressed image data, includes entropy decoding, dequantization and inverse DCT (IDCT).

Those processes will be discussed below specifically. The encoder/decoder 15 reads image data in a block by block manner from the frame memory 13 via the image-only bus 21, and performs a DCT on the read image data to generate DCT coefficient data. One block consists of a predetermined number of pixel data (8×8 pixel data in this embodiment). Then, the encoder/decoder 15 quantizes the DCT coefficient data with predetermined quantization coefficient data to generate quantized data. The encoder/decoder 15 performs entropy coding on the quantized data with predetermined coding coefficient data to generate compressed data. Compressed data includes quantization coefficient data and coding coefficient data, which are used in the expansion process, and is stored in the flash memory 20. Part of, or entire, entropy coding may be carried out based on a coding program previously stored in the CPU 16.

The encoder/decoder 15 reads compressed data from the flash memory 20 via the system bus 22 and performs entropy decoding on the compressed data with the coding coefficient data that is included in the read compressed data, thereby generating quantized data. Then, the encoder/decoder 15 dequantizes the quantized data using the quantization coefficient data included in the compressed data to generate DCT coefficient data. Further, the encoder/decoder 15 performs IDCT on the DCT coefficient data to produce expanded data. Part of, or entire, entropy decoding may be carried out based on a decoding program previously stored in the CPU 16. The expanded data is stored in the frame memory 13 via the image-only bus 21.

The CPU 16 has a ROM 17 where system program data for the image information processing apparatus 11 is stored, and a RAM 18 which temporarily stores data when the CPU 16 operates according to the system program. The system program data includes operation program data for a digital still camera for switching operations of a release button, a mode select switch (both not shown) and so forth as known by those of skill in the art. In accordance with the operation program data, the CPU 16 controls the operations of the image information processing apparatus 11, such as image recording, and displaying or erasing the recorded image.

The system program data includes control program data for controlling the encoder/decoder 15. Based on the control program data, the CPU 16 sends a control signal for a coding process to the encoder/decoder 15 at the time of recording an image, and sends a control signal for a decoding process to the encoder/decoder 15 at the time of displaying an image.

The system program data further includes computation program data for computing quantization coefficient data. In recording an image, the CPU 16 sends the encoder/decoder 15 a control signal for a double-pass process to execute coding twice. In the first pass, the encoder/decoder 15 performs coding using first quantization coefficient data, previously set for the luminance component and color difference component, to generate compressed image data. In this embodiment, the first quantization coefficient data is set to an average value obtained from plural pieces of image information.

In accordance with the operation program, the CPU 16 computes second quantization coefficient data based on the amount of compressed image data generated in the first pass by the encoder/decoder 15. The second quantization coefficient data is a value obtained from the status of the currently processed image. The state of an image affects the amount of compressed image data. Specifically, as the density of an image and the screen structure vary from one screen to another, the use of the first quantization coefficient data alone produces a difference in the amount of compressed image data. Based on the compressed image data produced using the first quantization coefficient data, therefore, the CPU 16 determines the status of the current image screen by screen to compute the second quantization coefficient data. The encoder/decoder 15 receives the second quantization coefficient data from the CPU 16, and performs coding again, this time using the second quantization coefficient data in the second pass, thereby generating new compressed image data. The amount of the new compressed image data generated in this manner is what has resulted from compression of the current image at the optimal compression rate. That is, the amount of the new compressed image data is less than the amount of the compressed image data obtained in the first pass.

The DCT coefficient memory 19 stores preferably one screen of DCT coefficient data. In the first pass, the encoder/decoder 15 receives image data in a block by block manner and executes DCT, quantization and entropy coding in a pipeline manner to generate compressed image data.

As shown in FIG. 9A, the encoder/decoder 15 first generates DCT coefficient data by performing DCT on the first block of image data, and then performs quantization on the first block of DCT coefficient data and DCT on the second block of image data in parallel. As the quantization ends earlier than the DCT, the encoder/decoder 15 carries out code/decode retrieval on the first block of quantized data in parallel during DCT of the second block of image data. As the code/decode retrieval ends earlier than the DCT, the encoder/decoder 15 carries out a packing process on the first block of code data in parallel. As the packing process ends more quickly than the DCT, the encoder/decoder 15 waits for DCT on the second block of image data to be completed, and, upon completion, performs DCT on the third block of image data, and quantization, code/decode retrieval and packing of the second block of image data in parallel.

The encoder/decoder 15 stores plural pieces of DCT coefficient data, obtained by performing DCT, in the DCT coefficient memory 19. That is, when coding in the first pass is completed, one screen of DCT coefficient data is stored in the DCT coefficient memory 19.

In the second pass, the encoder/decoder 15 reads the DCT coefficient data from the DCT coefficient memory 19 in a block by block manner and generates compressed data using the read DCT coefficient data. That is, DCT is omitted in the second pass. The time of transfer of the DCT coefficient data from the DCT coefficient memory 19 is considerably shorter than the DCT time. This shortens the DCT-originated wait time in the pipeline process.

As shown in FIG. 9B, first, the encoder/decoder 15 reads the first block of DCT coefficient data from the DCT coefficient memory 19 and quantizes that block of DCT coefficient data. The encoder/decoder 15 then transfers the second block of DCT coefficient data and performs code/decode retrieval on the first block of quantized data in parallel.

After the transfer of the second block of DCT coefficient data is completed, quantization of the second block starts. This means that quantization in the second pass starts earlier than that in the first pass. That is, the time from the end of quantization of the first block to the start of quantization of the second block is decreased. This results in a shorter coding time for one screen of image data in the second pass. As the transfer time for the DCT coefficients is shorter than the code/decode retrieval time, part of the code/decode retrieval of the first block and part of the quantization of the second block are carried out in parallel.

Figure 4:
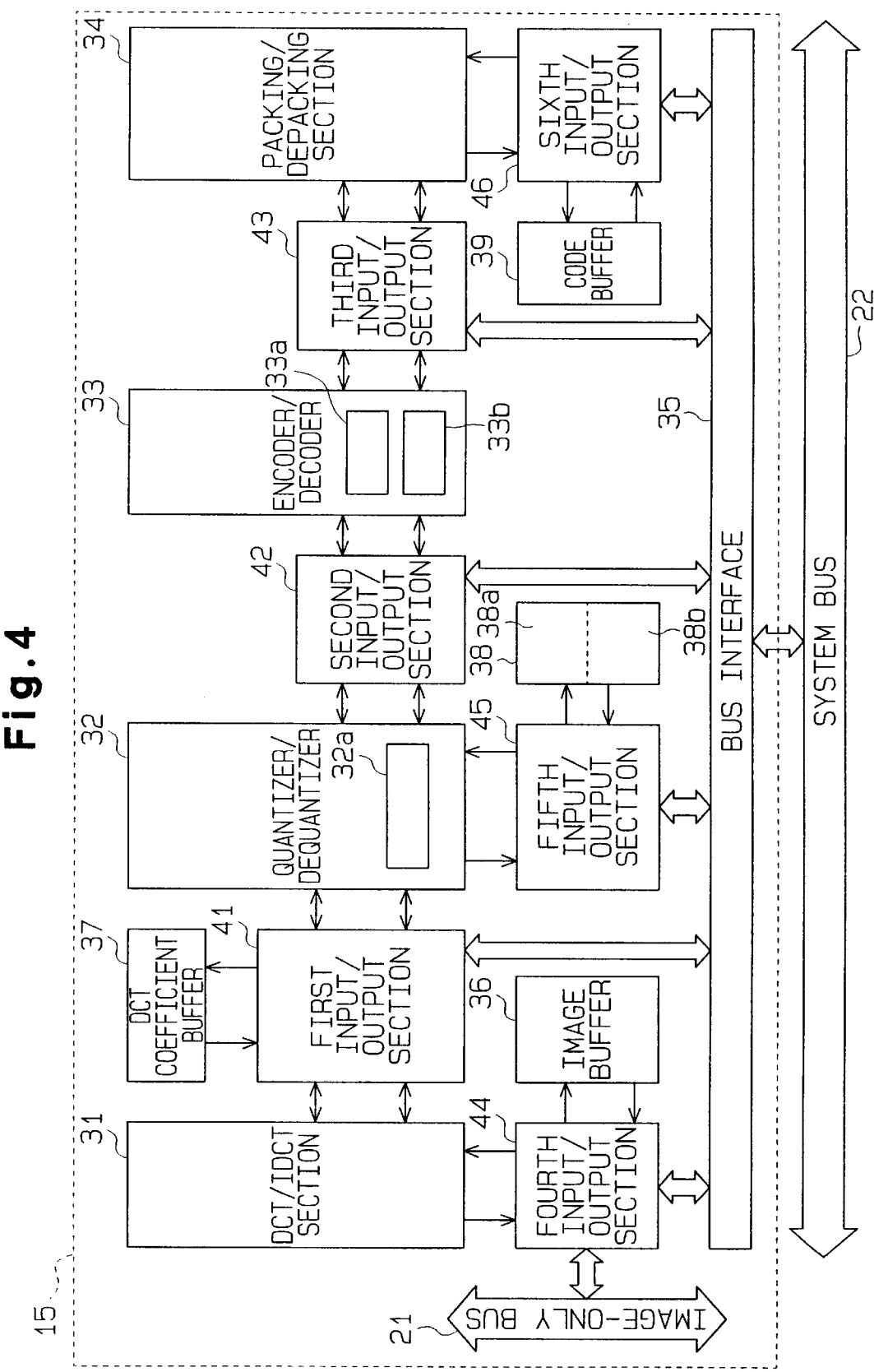
FIG. 4 is a block diagram of an encoder/decoder of the image information processing apparatus of FIG. 3.

As shown in FIG. 4, the encoder/decoder 15 includes a DCT/IDCT section 31 for performing DCT and IDCT, a quantizer 32 for performing quantization and dequantization, a code/decode retriever 33 for executing entropy coding and decoding, a packing/depacking section 34, which executes packing and depacking, a bus interface 35, an image buffer 36, a DCT coefficient buffer 37, a quantization coefficient buffer 38, a code buffer 39 and input/output sections 41 to 46.

The quantizer 32 has a register 32a which stores preferably one block of DCT coefficient data. The code/decode retriever 33 has a register 33a for storing preferably one block of quantized data and a storage section 33b for storing plural pieces of coding coefficient data. In this embodiment, the coding coefficient data is Huffman code data which has previously been assigned according to the frequency of occurrence.

Packing performed by the packing/depacking section 34 is a process for efficiently storing or accessing variable-length code data generated by the code/decode retriever 33, in the flash memory 20 as compressed image data. The variable-length code data has an arbitrary bit length preferably of 0 to 16 bits. The flash memory 20 supplies or stores data in a predetermined data unit (e.g., eight bits). The packing/depacking section 34 generates data of a predetermined number of bits from plural pieces of variable-length code data. In the depacking process, the packing/depacking section 34 generates variable-length code data from data of a predetermined number of bits which is read from the flash memory 20.

The bus interface 35, connected to the system bus 22, exchanges data and control signals with the CPU 16, the DCT coefficient memory 19 and the flash memory 20. The first to sixth input/output sections 41–46 are connected to the bus interface 35. The first input/output section 41 is connected to the DCT/IDCT section 31, the quantizer 32 and the DCT coefficient buffer 37. The DCT coefficient buffer 37 stores preferably one block of DCT coefficient data.

The DCT/IDCT section 31 and the quantizer 32, respectively, have controllers 47a and 47b (see FIGS. 7 and 10), which communicate with each other to exchange control signals for controlling the pipeline operation and data needed for the control. The code/decode retriever 33 and the packing/depacking section 34 likewise respectively include controllers 47c and 47d for pipeline control.

Through the communication between the controllers 47a and 47b, the quantizer 32 and the DCT/IDCT section 31 operate as follows. The quantizer 32 stands-by or waits until DCT ends. After finishing DCT, the DCT/IDCT section 31 stores the resulting DCT coefficient data into the DCT coefficient buffer 37 via the first input/output section 41. The controller 47a of the DCT/IDCT section 31 sends a fetch request signal for the DCT coefficient data to the quantizer 32 via the first input/output section 41. When the controller 47b receives the request signal, the quantizer 32 reads the DCT coefficient data from the DCT coefficient buffer 37, preferably in a zigzag scan manner, and stores it in the register 32a. After fetching of the DCT coefficient data is completed, the controller 47b sends an acknowledge signal to the DCT/IDCT section 31 via the first input/output section 41. When the controller 47a receives the acknowledge signal, the DCT/IDCT section 31 initiates DCT for the next block of image data.

The CPU 16 receives the controls signal, exchanged between the DCT/IDCT section 31 and the quantizer 32, via the first input/output section 41, the bus interface 35 and the system bus 22, and monitors the operations of the DCT/IDCT section 31 and the quantizer 32 based on the received control signal. Through this monitoring process, the CPU 16 stores the DCT coefficient data, generated in the coding process in the first pass, in the DCT coefficient memory 19, and transfers the DCT coefficient data, stored in the memory 19, in the coding process in the second pass.

Specifically, when the DCT/IDCT section 31 sends out a fetch request signal in the coding process in the first pass, the CPU 16 controls the first input/output section 41 to inhibit supply of the request signal to the quantizer 32. Under this circumstance, the CPU 16 reads one block of the DCT coefficient data from the DCT coefficient buffer 37 and stores it in the DCT coefficient memory 19. In this manner, the DCT coefficient data stored in the DCT coefficient buffer 37 is copied into the DCT coefficient memory 19.

After completing the storage of the DCT coefficient data, the CPU 16 sends the quantizer 32 a pseudo request signal, corresponding to the fetch request signal whose supply has been inhibited. In response to this pseudo request signal, the quantizer 32 starts reading the DCT coefficient data from the DCT coefficient buffer 37. After fetching of the DCT coefficient data is completed, the quantizer 32 sends an acknowledge signal to the DCT/IDCT section 31. In accordance with the acknowledge signal, the DCT/IDCT section 31 commences a DCT operation for the next block. Accordingly, before the quantizer 32 fetches DCT coefficient data from the DCT coefficient buffer 37, that DCT coefficient data is stored in the DCT coefficient memory 19.

In the coding process in the second pass, the CPU 16 first reads the DCT coefficient data from the DCT coefficient memory 19 in a block by block manner, and stores it in the DCT coefficient buffer 37 via the system bus 22, the bus interface 35 and the first input/output section 41. The CPU 16 then sends a pseudo fetch request signal for the DCT coefficient data to the quantizer 32.

In response to the pseudo request signal, the quantizer 32 reads the DCT coefficient data from the DCT coefficient buffer 37 and stores it in the register 32a. After reading of the DCT coefficient data is completed, the quantizer 32 sends an acknowledge signal. The CPU 16 receives the acknowledge signal and transfers the next block of the DCT coefficient data to the DCT coefficient buffer 37 from the DCT coefficient memory 19. In this manner, the coding process is executed in the second pass using one screen of DCT coefficient data stored in the DCT coefficient memory 19. Therefore, a DCT operation is not carried out in the coding process in the second pass. This shortens the coding processing time in the second pass.

The second input/output section 42 is connected between the quantizer 32 and the code/decode retriever 33. The controller 47b of the quantizer 32 and the controller 47c of the code/decode retriever 33 communicate with each other for the pipeline process via the second input/output section 42. The quantizer 32 sends a fetch request signal for quantized data after quantization is finished. When the code/decode retriever 33 is ready to receive data, the quantizer 32 sends the quantized data (to which information including quantization coefficient data that has been used at the time of quantization is appended).

The code/decode retriever 33 stores the quantized data in the register 33a, and sends an acknowledge signal after fetching of one block of quantized data is completed. In response to the acknowledge signal, the quantizer 32 initiates quantization of the next block.

The third input/output section 43 is connected between the code/decode retriever 33 and the packing/depacking section 34. The controller 47c of the code/decode retriever 33 and the controller 47d of the packing/depacking section 34 communicate with each other for the pipeline process.

After code retrieving is completed, the code/decode retriever 33 sends a fetch request signal for variable-length code data. When the packing/depacking section 34 is ready to receive data, the code/decode retriever 33 sends the packing/depacking section 34 variable-length code data (to which information including Huffman code data that has been used at the time of coding is appended).

The packing/depacking section 34 stores the variable-length code data and sends an acknowledge signal after fetching one block of variable-length code data is completed. In response to the acknowledge signal, the code/decode retriever 33 starts code retrieval for the next block.

The CPU 16 appends information to the data transferred between the individual sections 31 to 34, using the first to third input/output sections 41 to 43. For example, the CPU 16 appends information to variable-length code data, which is supplied to the packing/depacking section 34 from the code/decode retriever 33 along the data path as indicated by the solid-line arrow in FIG. 10.

For example, variable-length code data includes code data (MCU: Minimum Coded Unit) in relation to image information like the luminance and color difference of an image. The CPU 16 appends information to the variable-length code data. This information includes information indicating the start and end of data and information of coefficient data used in quantization and coding. The appended information allows another image information processing apparatus to process the compressed image data stored in the flash memory 20.

Specifically, the CPU 16 controls the bus interface 35 and the third input/output section 43 to inhibit supply of a request signal from the code/decode retriever 33 to the packing/depacking section 34, and supplies a pseudo acknowledge signal in place of the acknowledge signal from the packing/depacking section 34 to the code/decode retriever 33. The CPU 16 therefore receives variable-length code data from the code/decode retriever 33 via the third input/output section 43, the bus interface 35 and the system bus 22, regardless of the operational status of the packing/depacking section 34. The CPU 16 appends information between individual MCUs which forms the variable-length code data. The appended information is stored preferably in the ROM 18 of the CPU 16.

The CPU 16 controls the bus interface 35 and the third input/output section 43 to send a pseudo request signal to the packing/depacking section 34, and inhibit the packing/depacking section 34 from supplying an acknowledge signal to the code/decode retriever 33 in response to that pseudo request signal. Accordingly, the packing/depacking section 34 receives new information-appended variable-length code data from the CPU 16 via the system bus 22, the bus interface 35 and the third input/output section 43, irrespective of the operational status of the code/decode retriever 33.

The CPU 16 may control the individual input/output sections 41–43 properly to append information for image compensation to data which is transferred via the input/output sections 41–43.

In the decoding process, data is transferred along the reverse path to the one used in the coding process. Specifically, the packing/depacking section 34 performs depacking to generate variable-length code data (to which information is appended). The CPU 16 removes the information appended to the generated variable-length code data and supplies the resultant variable-length code data to the code/decode retriever 33. The code/decode retriever 33 performs decode retrieval on the variable-length code data to generate quantized data.

Further, the CPU 16 executes processes in place of the individual sections 31–34 using the first to third input/output sections 41–43. For example, the CPU 16 acts for the code/decode retriever 33 to execute code/decode retrieval in the data path as indicated by the broken-line arrow in FIG. 10, by using the second and third input/output sections 42 and 43.

More specifically, the CPU 16 sends a pseudo acknowledge signal to the quantizer 32 via the bus interface 35 and the second input/output section 42, and sends a pseudo request signal to the packing/depacking section 34 via the bus interface 35 and the third input/output section 43. In response to the pseudo acknowledge signal, the quantizer 32 sends the generated quantized data to the second input/output section 42. The CPU 16 receives the quantized data via the second input/output section 42, the bus interface 35 and the system bus 22, and produces variable-length code data from the quantized data according to the coding program (code/decode retrieving program). The code/decode retrieving program preferably uses coding data (which is used in various sorts of coding, including Huffman code data) stored in the RAM 18 in the CPU 16 or the DCT coefficient memory 19.

The CPU 16 supplies the produced variable-length code data to the packing/depacking section 34 via the system bus 22, the bus interface 35 and the third input/output section 43. In response to the pseudo request signal, the packing/depacking section 34 receives the variable-length code data from the CPU 16 and executes the packing process on the variable-length code data. The CPU 16 receives associated data used in coding from the packing/depacking section 34 and stores the associated data preferably in the RAM 18.

In the decoding process, the packing/depacking section 34 performs an depacking process to generate variable-length code data. The CPU 16 carries out code/decode retrieval on the variable-length code data using the associated data, stored in the RAM 18, generating quantized data. The quantizer 32 receives the quantized data from the CPU 16 and dequantizes the quantized data to generate DCT coefficient data.

The CPU 16 may control the first input/output section 41 to act for the DCT/IDCT section 31 to carry out the DCT operation. The CPU 16 may control the first and second input/output sections 41 and 42 to act for the quantizer 32 to carry out quantization. Further, the CPU 16 may control the third input/output section 43 to act for the packing/depacking section 34 to execute the packing process. In the code/decode retrieving process, the CPU 16 may act for the code/decode retriever 33 and append information to data at the same time.

The fourth input/output section 44 is connected to the DCT/IDCT section 31 and the image-only bus 21. The fourth input/output section 44 is also connected to the image buffer 36 which has a capacity of preferably storing one block of image data.

In response to the control signal from the CPU 16, the fourth input/output section 44 reads the image data from the frame memory 13 in a block by block manner via the image-only bus 21 and stores the image data in the image buffer 36. The DCT/IDCT section 31 accesses the image buffer 36 via the fourth input/output section 44 to read the image data therefrom, and performs DCT to that image data.

In the decoding process, the DCT/IDCT section 31 stores the expanded image data, generated in the IDCT operation, via the fourth input/output section 44 in the image buffer 36. The fourth input/output section 44 reads the expanded image data from the image buffer 36 and stores the data in the frame memory 13 via the image-only bus 21.

The fifth input/output section 45 is connected to the quantizer 32. The fifth input/output section 45 is also connected to the quantization coefficient buffer 38. The quantization coefficient buffer 38 has a first buffer 38a for storing first quantization coefficient data and a second buffer 38b for storing second quantization coefficient data. The first buffer 38a, constituted of a non-volatile memory, is used to store preset first quantization coefficient data. The second buffer 38b, constituted of a rewritable memory, is used to store second quantization coefficient data, which has been computed by the CPU 16, via the system bus 22, the bus interface 35 and the fifth input/output section 45.

In response to the control signal from the CPU 16, the fifth input/output section 45 connects the quantizer 32 to the first buffer 38a in the coding process in the first pass and connects the quantizer 32 to the second buffer 38b in the coding process in the second pass. The first buffer 38a is preferably a non-volatile semiconductor memory, which stores preset first quantization coefficient data. The second buffer 38b is preferably a rewritable memory, which stores the second quantization coefficient data.

The sixth input/output section 46, connected between the packing/depacking section 34 and the code buffer 39, stores one block of variable-length code data. In response to the control signal from the CPU 16, the sixth input/output section 46 accesses the code buffer 39 to store compressed image data there in the coding process. After completing coding of one block, the sixth input/output section 46 transfers the compressed image data, stored in the code buffer 39, to the flash memory 20 via the bus interface 35 and the system bus 22.

In the decoding process, the sixth input/output section 46 transfers the compressed image data from the flash memory 20 to the code buffer 39 via the system bus 22 and the bus interface 35. The packing/depacking section 34 reads the compressed image data from the code buffer 39 via the sixth input/output section 46 and produces variable-length code data.

Figure 5:
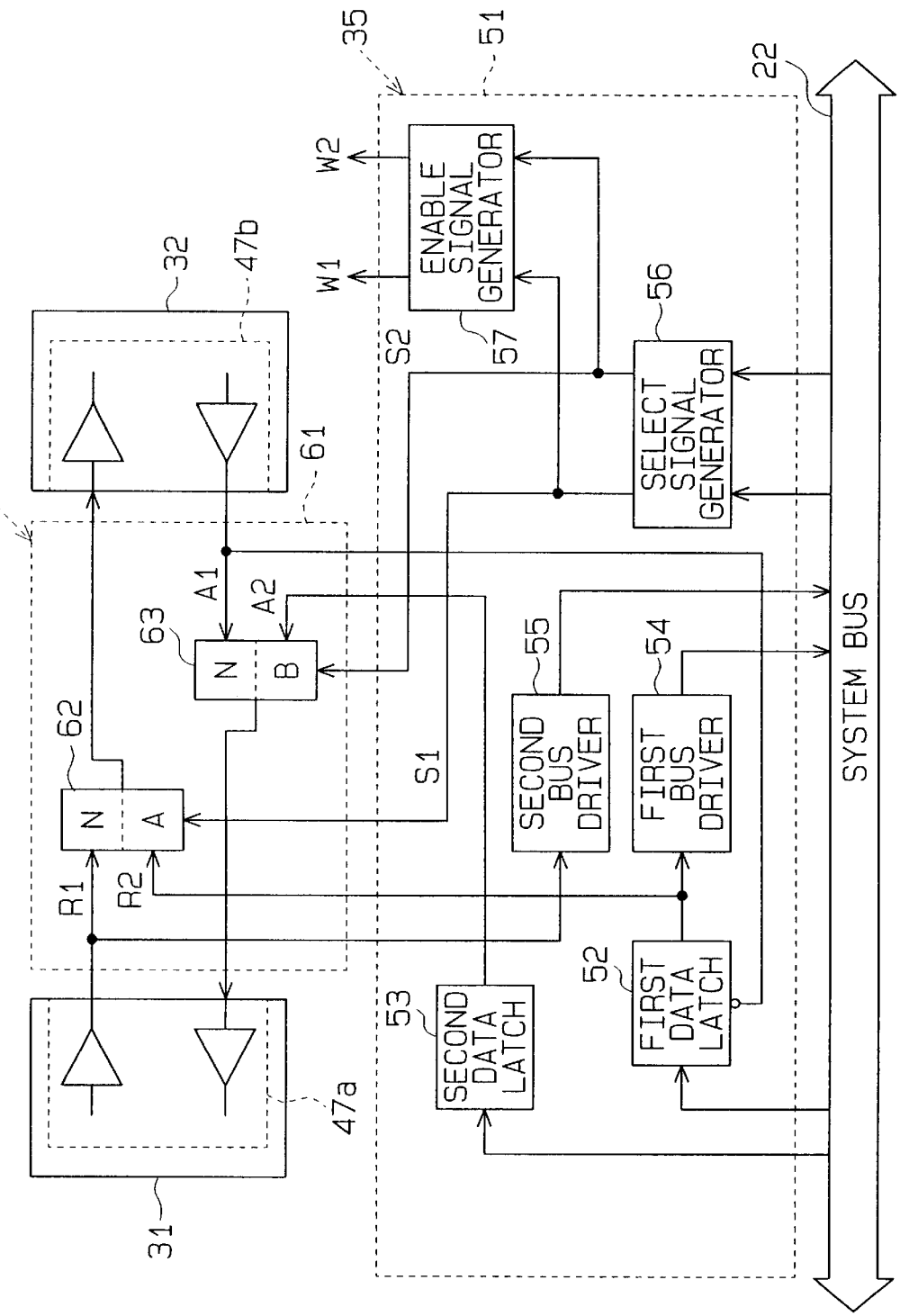
FIG. 5 is a partial circuit diagram of a bus interface and a first input/output section of the encoder/decoder of FIG. 4.

FIG. 5 is a circuit diagram of the bus interface 35 including a first interface section 51, connected to the first input/output section 41, for monitoring and controlling signals which are exchanged between the DCT/IDCT section 31 and the quantizer 32, and the first input/output section 41 including a first selection circuit 61.

The first selection circuit 61 has two selectors 62 and 63. The first selector 62 selects either a request signal R1 output from the DCT/IDCT section 31 or a pseudo request signal R2 output from the CPU 16. The second selector 63 selects either an acknowledge signal A1 output from the quantizer 32 or a pseudo acknowledge signal A2 output from the CPU 16.

The first interface section 51 has two data latches 52 and 53, two bus drivers 54 and 55, a select signal generator 56 and an enable signal generator 57. The first data latch 52 latches the pseudo request signal R2 output via the system bus 22 from the CPU 16, and sends the latched pseudo request signal R2 to the first bus driver 54 and the first selector 62. The first data latch 52, having a reset terminal for receiving the acknowledge signal A1, clears latched data, and outputs an inactive (e.g., L level) signal, in response to the active (e.g., H level) acknowledge signal A1.

The first bus driver 54 amplifies the input signal and sends the amplified input signal to the CPU 16 via the system bus 22. The inactive, amplified input signal from the first bus driver 54 allows the CPU 16 to acknowledge that the quantizer 32 has outputted the acknowledge signal A1.

The second data latch 53 latches the pseudo acknowledge signal A2 output via the system bus 22 from the CPU 16, and sends the latched pseudo acknowledge signal A2 to the second selector 63. The second bus driver 55 receives the request signal R1 and sends the amplified request signal R1 to the CPU 16 via the system bus 22.

The select signal generator 56 receives the control signal from the CPU 16 via the system bus 22 and sends first and second select signals S1 and S2 respectively to the first and second selectors 62 and 63 in response to that control signal.

In response to the active first and second select signals S1 and S2, the enable signal generator 57 respectively supplies first and second enable signals W1 and W2 to the DCT/IDCT section 31 and the quantizer 32. The DCT/IDCT section 31 and the quantizer 32 are enabled in response to the active first and second enable signals W1 and W2 and stop operating in response to the inactive first and second enable signals W1 and W2.

The controller 47a in the DCT/IDCT section 31 and the controller 47b in the quantizer 32 keep operating to communicate with each other, regardless of the first and second enable signals W1 and W2. The controller 47a is holding information necessary for quantization, e.g., interleave information about the luminance and color difference of pixels in DCT. The controller 47a transfers that information to the controller 47b. The controller 47b therefore requires no circuitry for retaining information. This feature eliminates circuit redundancy and helps reduce chip area.

The first selector 62 selects the pseudo request signal R2 in response to, for example, the H-level first select signal S1 from the select signal generator 56, and selects the request signal R1 in response to the L-level first select signal S1. The second selector 63 selects the pseudo acknowledge signal A2 in response to, for example, the H-level second select signal S2 from the select signal generator 56, and selects the acknowledge signal A1 in response to the L-level second select signal S2.

Figure 6:
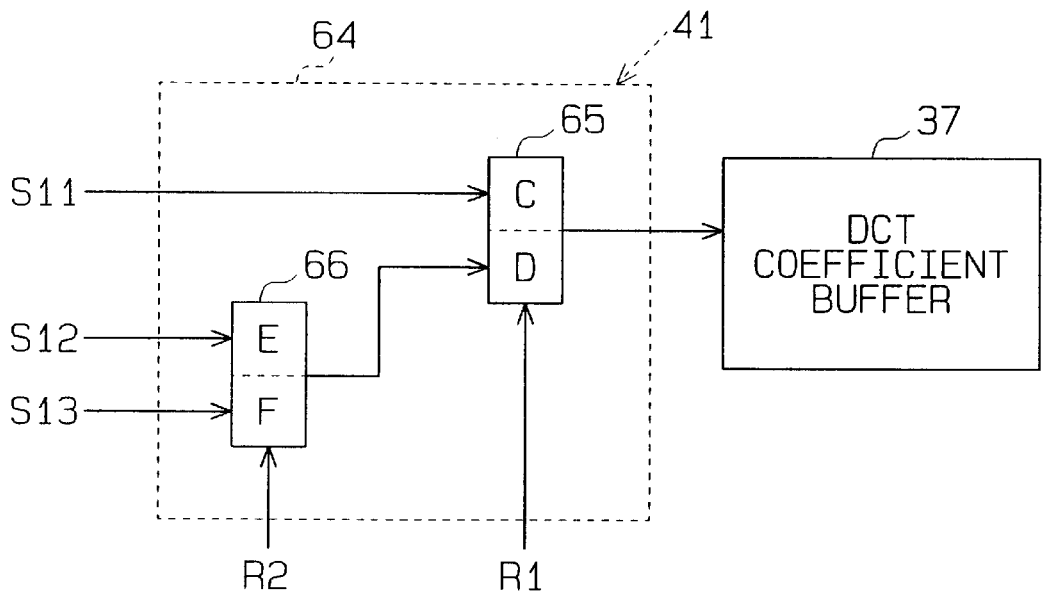
FIG. 6 is a partial circuit diagram of the first input/output section of the encoder/decoder of FIG. 4.
Figure 7:
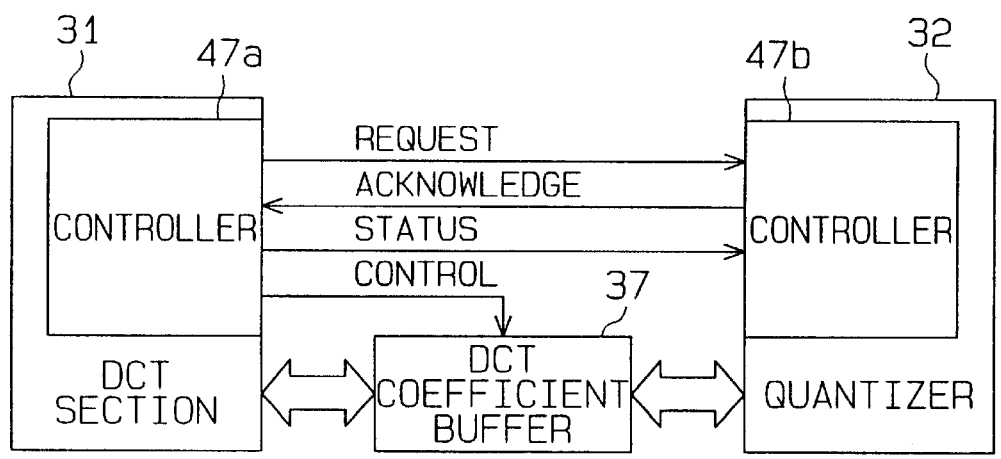
FIG. 7 is a diagram showing communication between a DCT section and a quantizer of the encoder/decoder of FIG. 4.

FIG. 6 is a circuit diagram of the first input/output section 41 which includes a second selection circuit 64 for access signals supplied to the DCT coefficient buffer 37. The second selection circuit 64 has two selectors 65 and 66 for selecting one of access signals S11, S12 and S13 from the CPU 16 and the quantizer 32.

In response to the request signal R1 from the DCT/IDCT section 31, the third selector 65 selects either the access signal S11 of the DCT/IDCT section 31 or the access signal S12 or S13 from the fourth selector 66, and sends the selected access signal to the DCT coefficient buffer 37. In response to the inactive request signal R1, for example, the third selector 65 selects the access signal S11 of the DCT/IDCT section 31.

In response to the pseudo request signal R2 from the CPU 16, the fourth selector 66 selects either the access signal S12 of the CPU 16 or the access signal S13 of the quantizer 32 and sends the selected access signal to the third selector 65. In response to the inactive pseudo request signal R2, for example, the fourth selector 66 selects the access signal S12 of the CPU 16.

The operations of the first interface section 51 and the first selection circuit 61 in the coding process will now be discussed.

Coding in First Pass

The CPU 16 sends the L-level pseudo request signal R2 and the L-level pseudo acknowledge signal A2 to the first and second data latches 52 and 53, respectively. Then, the CPU 16 sends the control signal so that the select signal generator 56 outputs the H-level first and second select signals S1 and S2, and the enable signal generator 57 outputs the H-level first and second enable signals W1 and W2. In response to the H-level first and second enable signals W1 and W2, the DCT/IDCT section 31 and the quantizer 32 are enabled.

The controller 47a outputs the L-level request signal R1 while the DCT/IDCT section 31 is carrying out DCT of one block. In response to the L-level request signal R1, the third selector 65 selects the access signal S11 of the DCT/IDCT section 31 and sends the signal S11 to the DCT coefficient buffer 37. This permits the DCT/IDCT section 31 to access the DCT coefficient buffer 37, so that the DCT/IDCT section 31 stores one block of DCT coefficient data in the DCT coefficient buffer 37, as shown in FIG. 8A. The controller 47a outputs the H-level request signal R1 after storage of the DCT coefficient data is completed. As the first selector 62 has selected the pseudo request signal R2 in response to the H-level first select signal S1, however, the request signal R1 is not transmitted to the quantizer 32. The quantizer 32 thus maintains the standby status.

The third and fourth selectors 65 and 66 select the access signal S12 of the CPU 16 in response to the H-level request signal R1 and the L-level pseudo request signal R2, respectively. This allows the CPU 16 to access the DCT coefficient buffer 37. The CPU 16 reads one block of DCT coefficient data from the DCT coefficient buffer 37 and stores it in the DCT coefficient memory 19.

After storing the DCT coefficient data finishes, the CPU 16 outputs the H-level pseudo request signal R2. The pseudo request signal R2 is latched by the first data latch 52, and supplied to the first bus driver 54 and the first selector 62. In response to the H-level first select signal S1, the first selector 62 selects the pseudo request signal R2 and sends it to the quantizer 32. In response to the H-level request signal R1 and the H-level pseudo request signal R2, respectively, the third and fourth selectors 65 and 66 select the access signal S13 of the quantizer 32. This permits the quantizer 32 to access the DCT coefficient buffer 37. In response to the H-level pseudo request signal R2, the quantizer 32 starts reading one block of DCT coefficient data from the DCT coefficient buffer 37. After reading the DCT coefficient data finishes, the quantizer 32 outputs the H-level acknowledge signal A1. As the second selector 63 has selected the pseudo acknowledge signal A2 in response to the H-level second select signal S2, however, the acknowledge signal A1 is not transmitted to the DCT/IDCT section 31. The DCT/IDCT section 31 thus maintains the standby status.

The latched data in the first data latch 52 is cleared by the H-level acknowledge signal A1, and an L-level signal is sent to the CPU 16. Based on the L-level signal, the CPU 16 acknowledges the reading of the DCT coefficient data by the quantizer 32 is completed, and outputs the H-level pseudo acknowledge signal A2. The H-level pseudo acknowledge signal A2 is latched in the second data latch 53, and supplied to the second selector 63 of the first selection circuit 61. In response to the H-level second select signal S2, the second selector 63 sends the H-level pseudo acknowledge signal A2 to the DCT/IDCT section 31. The DCT/IDCT section 31 initiates DCT of the next block in response to the H-level pseudo acknowledge signal A2.

Coding in Second Pass

The CPU 16 sends the L-level pseudo request signal R2 and the L-level pseudo acknowledge signal A2 to the first and second data latches 52 and 53, respectively. Then, the CPU 16 sends the control signal to the select signal generator 56 to stop the operation of the DCT/IDCT section 31 and enable the quantizer 32. The select signal generator 56 outputs the L-level first select signal S1 and the H-level second select signal S2 in response to the control signal, and the enable signal generator 57 outputs the L-level first enable signal W1 and the H-level second enable signal W2. In response to the L-level first enable signal W1, the DCT/IDCT section 31 stops the operation. However, the controller 47a keeps operating and outputs the H-level request signal R1, as shown in FIG. 8B. In response to the H-level second enable signal W2, the quantizer 32 is enabled. The inhibition of the operation of the DCT/IDCT section 31 reduces power dissipation of the image information processing apparatus 11.

In response to the H-level request signal R1 and the L-level pseudo request signal R2, respectively, the third and fourth selectors 65 and 66 select the access signal S12 of the CPU 16. This permits the CPU 16 to access the DCT coefficient buffer 37, and the CPU 16 transfers one block of DCT coefficient data to the DCT coefficient buffer 37 from the DCT coefficient memory 19.

After transferring of the DCT coefficient data is finished, the CPU 16 outputs the H-level pseudo request signal R2, which is in turn latched by the first data latch 52 and then supplied to the first bus driver 54 and the first selector 62.

In response to the H-level request signal R1 and the H-level pseudo request signal R2, respectively, the third and fourth selectors 65 and 66 select the access signal S13 of the quantizer 32. This allows the quantizer 32 to access the DCT coefficient buffer 37.

The quantizer 32 receives the H-level pseudo request signal R2, selected by the first selector 62, in response to which the quantizer 32 starts reading one block of DCT coefficient data from the DCT coefficient buffer 37.

After reading the DCT coefficient data is completed, the quantizer 32 outputs the H-level acknowledge signal A1 to clear the latched data in the first data latch 52, and an L-level signal is sent from the first data latch 52 as a consequence. Based on the L-level signal, the CPU 16 acknowledges that readout of the DCT coefficient data by the quantizer 32 has finished, and starts reading the next block of DCT coefficient data from the DCT coefficient buffer 37.

The CPU 16 and other components repeat the above-described operation. Accordingly, one screen of DCT coefficient data is subjected to processing subsequent to quantization without involving a DCT operation.

It should be apparent to those skilled in the art that the present invention may be embodied in many other specific forms without departing from the spirit or scope of the invention. Particularly, it should be understood that the invention may be embodied in the following forms.

The controllers 47a–47d may have functions to test the associated DCT/IDCT section 31, quantizer 32, code/decode retriever 33 and packing/depacking section 34. As shown in FIG. 10, the CPU 16 supplies test mode signals TM1 to TM4 to the respective controllers 47a–47d. In response to the test mode signals TM1 to TM4, the controllers 47a–47d respectively output internal signals of the sections 31–34. The CPU 16 receives the internal signals from the individual sections 31–34 via the first to third input/output sections 41–43, the bus interface 35 and the system bus 22 and determines if the individual sections 31–34 are normal based on the internal signals.

When the CPU 16 acts for the code/decode retriever 33 for the code/decode retrieving process, for example, the CPU 16 may send an inactive enable signal to the code/decode retriever 33 to disable the code/decode retriever 33.

The enable signals which are supplied to the DCT/IDCT section 31 and the quantizer/dequantizer 32 may be designed as a single common signal. Specifically, the enable signal generator 57 is connected to the DCT/IDCT section 31 and the quantizer/dequantizer 32 via switches SW1 and SW2, respectively. It is preferable that the switches SW1 and SW2 be MOS transistors which are to be turned on or off by the CPU 16.

Figure 11:
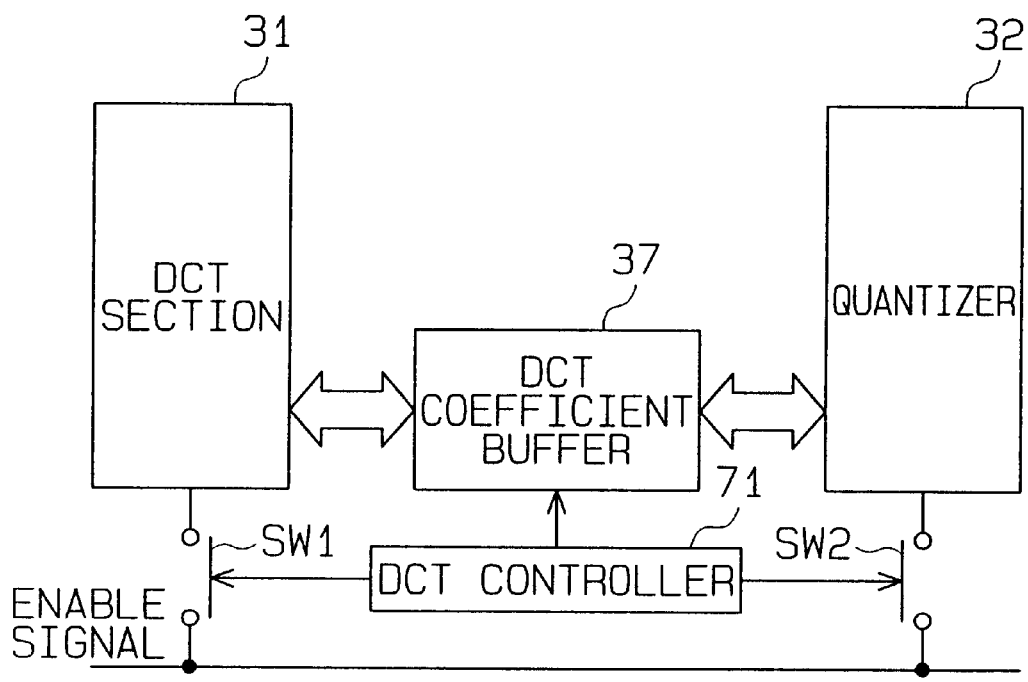
FIG. 11 is a partial block diagram showing another example of the encoder/decoder of FIG. 4.

As shown in FIG. 11, the encoder/decoder 15 may include a DCT controller 71, which controls access to the DCT coefficient buffer 37 and also controls the ON/OFF actions of the switches SW1 and SW2 to selectively supply the enable signal to the DCT/IDCT section 31 or the quantizer/dequantizer 32. In the coding process in the first pass, the DCT controller 71 sets the switch SW1 on to send the enable signal to the DCT/IDCT section 31 so that the DCT/IDCT section 31 operates in response to the enable signal. In the coding process in the second pass, the DCT controller 71 sets the switch SW2 off to block the supply of the enable signal so that the DCT/IDCT section 31 stops operating. This structure reduces power consumption in the second pass.

The flash memory (flash EEPROM) 20 which stores compressed data may be replaced with an EEPROM, ferroelectric memory or battery-backed-up SRAM. The present invention may be adapted to an image information processing apparatus 11 to which a card-like memory is installed. Compressed data recorded in the flash memory may be transferred to the card-like memory.

Therefore, the present examples and embodiment are to be considered as illustrative and not restrictive and the invention is not to be limited to the details given herein, but may be modified within the scope and equivalence of the appended claims.

What is claimed is:

1. An image data processing apparatus, comprising:

a first memory storing at least one screen of image data;

a first bus transferring the image data to the first memory;

an encoder/decoder, connected to the first bus, receiving the image data from the first memory in a block-by-block manner, compressing the received image data via first and second encoding processes and producing compressed data, decoding the compressed data via first and second decoding processes, and producing decompressed image data, with the encoder/decoder including a coefficient buffer storing at least one screen of discrete cosine transformation (DCT) coefficient data produced by the encoder/decoder;

a processor controlling the encoding and decoding processes performed by the encoder/decoder;

a second bus connecting the encoder/decoder with the processor;

a second, coefficient memory, connected to the encoder/decoder via the second bus, storing at least one screen of DCT coefficient data produced by the encoder/decoder during the first encoding process; and a third memory, connected to the encoder/decoder via the second bus, storing the compressed data, wherein the first encoding process includes DCT, quantization, entropy coding, and storing the DCT coefficient data of a first screen of image data into the second memory; and the decoding process includes entropy decoding dequantization, and inverse DCT, and wherein the second encoding process includes transferring the DCT coefficient data of the first screen of image data from the second memory to the coefficient buffer for performing quantization and entropy coding.

2. The image data processing apparatus according to claim 1, wherein the compressed data stored in the third memory includes quantization coefficient data and coding quantization data, which are used in the decoding process.

* * * * *